US011217968B2

(12) United States Patent
Reinsch et al.

(10) Patent No.: US 11,217,968 B2
(45) Date of Patent: Jan. 4, 2022

(54) SPARK PLUG RESISTANCE ELEMENT WITH INCREASED ZRSIO₄ PHASE FRACTION

(71) Applicant: Robert Bosch GmbH, Stuttgart (DE)

(72) Inventors: Benedikt Reinsch, Riederich (DE);
Hubertus Braun, Renningen (DE);
Patrick Armstrong, Bamberg (DE);
Stefan Nufer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 16/754,547

(22) PCT Filed: Sep. 26, 2018

(86) PCT No.: PCT/EP2018/076113
§ 371 (c)(1),
(2) Date: Apr. 8, 2020

(87) PCT Pub. No.: WO2019/072565
PCT Pub. Date: Apr. 18, 2019

(65) Prior Publication Data
US 2020/0350747 A1    Nov. 5, 2020

(30) Foreign Application Priority Data

Oct. 10, 2017   (DE) ............... 10 2017 218 032.3

(51) Int. Cl.
*H01T 13/41*      (2006.01)
*H01T 21/02*      (2006.01)

(52) U.S. Cl.
CPC ............. *H01T 13/41* (2013.01); *H01T 21/02* (2013.01)

(58) Field of Classification Search
CPC . H01T 13/41; H01T 21/02; C04B 2235/3244; C04B 2235/3418;
(Continued)

(56) References Cited

U.S. PATENT DOCUMENTS 4,004,183 A    1/1977   Oki et al.
4,601,848 A    7/1986   Sakai et al.
(Continued)

FOREIGN PATENT DOCUMENTS

CN    1393968 A    1/2003
CN    101616878 A    12/2009
(Continued)

OTHER PUBLICATIONS

International Search Report for PCT/EP2018/076113, dated Oct. 26, 2018.

*Primary Examiner* — Kevin Quarterman
(74) *Attorney, Agent, or Firm* — Norton Rose Fulbright US LLP; Gerard Messina

(57) ABSTRACT

A method for manufacturing a spark plug. The method includes: furnishing an insulator; introducing into the insulator a material mixture that is configured to constitute a resistor paste, the material mixture containing $ZrO_2$ and $SiO_2$; heating the insulator and the material mixture present therein to a temperature T of at least 870° C., so that $ZrO_2$ and $SiO_2$ in the material mixture react at least partly to $ZrSiO_4$.

14 Claims, 4 Drawing Sheets

(58) Field of Classification Search
CPC ... C04B 2235/365; C04B 35/16; C04B 35/48; H01C 7/108
See application file for complete search history.

(56) References Cited

U.S. PATENT DOCUMENTS

| | | | | | |
|---|---|---|---|---|---|
| 6,160,342 | A | * | 12/2000 | Nishikawa | H01T 21/02 313/141 |
| 2012/0176021 | A1 | * | 7/2012 | Yoshida | H01T 13/41 313/141 |
| 2015/0069902 | A1 | * | 3/2015 | Kita | H01T 13/41 313/130 |
| 2015/0214697 | A1 | * | 7/2015 | Yoshida | H01T 13/41 315/59 |
| 2016/0204579 | A1 | | 7/2016 | Yoshida et al. | |
| 2016/0204580 | A1 | * | 7/2016 | Yoshida | H01T 13/34 313/141 |

FOREIGN PATENT DOCUMENTS

| | | |
|---|---|---|
| DE | 2520787 A1 | 11/1975 |
| DE | 3501558 A1 | 7/1985 |
| DE | 298572 A5 | 2/1992 |
| DE | 69806437 T2 | 11/2002 |
| DE | 102009047055 A1 | 5/2011 |
| EP | 0874432 A2 | 10/1998 |
| JP | S61253786 A | 11/1986 |

* cited by examiner

SPARK PLUG RESISTANCE ELEMENT WITH INCREASED ZRSIO4 PHASE FRACTION

FIELD

The present invention relates to a spark plug and to a manufacturing method for a spark plug.

BACKGROUND INFORMATION

In order to reduce electrode wear and avoid electromagnetic interference (EMI) in the spark plug and in the internal combustion engine, present-day spark plugs have a resistance element having a specific resistance in the range from 1 to 14 kilohm. The resistance element is typically disposed in the spark plug inside the spark plug insulator, between the terminal pin and the center electrode. The resistance element is often a material mixture made up of a variety of conductive particles and nonconductive particles, for example carbon or carbon black, $ZrO_2$, and borosilicate glass. The specific electrical resistance for the resistance element results, inter alia, from the material composition and material distribution.

As with all resistors, the resistance element too has a maximum current intensity that can flow through the resistance element before a current breakdown occurs in the resistance element and destroys it. This maximum current intensity is, inter alia, an indicator of the electrical stability of the resistance element, and is critical in terms of the service life of the spark plug.

In addition, the resistance element ages over time and with increasing operating duration, the resistance of the resistance element becoming higher with time. It becomes necessary as a result to operate the spark plug at higher voltages so that it continues to function. As the operating voltage keeps increasing, there is a greater risk of a voltage flashover from the terminal pin or from the center electrode, through the insulator, into the housing, thereby destroying the insulator and the entire spark plug. The long-term stability of the resistance of the resistance element is thus also an indicator of the electrical stability of the resistance element, and is crucial in terms of the service life of the spark plug.

SUMMARY

An object of the present invention is to furnish a spark plug having an improved resistance element that has excellent electrical stability, as well as a manufacturing element for that spark plug.

This object may be achieved according to the present invention. In accordance with the present invention, an example spark plug has: a housing; an insulator disposed in the housing; a center electrode disposed in the insulator; a terminal pin disposed in the insulator; a resistance element that is disposed in the insulator and is disposed physically between the center electrode and the terminal pin and electrically connects the center electrode to the terminal pin, the resistance element containing a resistor paste, the resistor paste being made up of a material mixture that contains, inter alia, $ZrO_2$ and $SiO_2$; and a ground electrode that is disposed on a combustion-chamber-side end face of the housing and, together with the center electrode, forms a spark gap, by the fact that the material mixture of the resistor paste also contains $ZrSiO_4$.

During the manufacturing method, the insulator is heated together with the resistance element or resistor paste contained therein. Before this heating operation, the resistor paste contains $ZrO_3$ and $SiO_2$, and no $ZrSiO_4$. As a result of heating to a temperature of, for example, at least 870° C., a transformation of $ZrO_2$ together with $SiO_2$ to yield $ZrSiO_4$ is initiated. Experiments by the Applicant have shown that spark plugs having a resistor paste that contains $ZrSiO_4$ have substantially greater resistance stability during operation of the spark plug. In spark plugs having a $ZrSiO_4$-free resistor paste, the resistance changes considerably after a few hundred operating hours, so that higher and higher voltages need to be applied to the spark plug in order to maintain spark plug functionality, thereby in turn increasing the risk that voltage will flash over from the terminal pin or the center electrode, through the insulator, into the housing and destroy the spark plug.

The spark plug according to the present invention does not have this problem, since because of the $ZrSiO_4$ in the resistor paste, the resistance of the resistor paste is substantially more stable and changes only slightly even after several hundred operating hours, with the result that the spark plug can be operated for a long time at a normal voltage. For the experiments, the spark plug according to the present invention was operated a voltage of 30 kV, a temperature of 250° C., and a pulse frequency of 100 Hz.

Further advantageous embodiments of the present invention are described herein.

The Applicant's experiments have shown in particular that the advantageous effect occurs particularly well when a transformation rate q is equal to 40%, where $$q = \frac{w(ZrSiO_4)}{(w(ZrSiO_4) + w(ZrO_2))},$$

where w(X) is the proportion of material X, in wt %, in the resistor paste, where X is $ZrSiO_4$ or $ZrO_2$.

It is particularly advantageous if the transformation rate q is equal to at least 50%. Experiments have shown that a saturation of the transformation rate exists at 50-55%, and that the transformation rate does not increase further even as a result of a higher temperature or a longer heating time.

Alternatively or additionally, provision is made that a relative resistance change in the resistor paste after at least 300 operating hours is less than 50%, preferably less than 35%. Ideally, the relative resistance change at least 500 operating hours is less than 50%.

In a refinement of the present invention, the resistance element is a layer system that encompasses the resistor paste and at least one contact paste. The at least one contact paste is disposed physically between the terminal pin and the resistor paste or between the center electrode and the resistor paste; or, if there are two contact pastes, a first contact paste is disposed physically between the terminal pin and the resistor paste, and a second contact paste physically between the resistor paste and the center electrode.

A further aspect of the present invention relates to a manufacturing method for a spark plug, for example the example spark plug according to the present invention. An example embodiment according to the present invention includes the following steps:

furnishing an insulator;
introducing into the insulator a material mixture that is configured to constitute a resistor paste, the material mixture containing $ZrO_2$ and $SiO_2$;

heating the insulator and the material mixture present therein to a temperature T of at least 870° C., so that $ZrO_2$ and $SiO_2$ in the material mixture react at least partly to $ZrSiO_4$.

In accordance with the present invention, provision is advantageously made that the material mixture for the resistor paste is heated until a transformation rate q equal to at least 40% has occurred, the transformation rate q being defined by the formula $$q = \frac{w(ZrSiO_4)}{(w(ZrSiO_4) + w(ZrO_2))},$$

where w(X) is the proportion of material X, in wt %, in the resistor paste, where X is $ZrSiO_4$ or $ZrO_2$.

Experiments have shown that, advantageously, the temperature T is in the range from 870° C. to 965° C. At temperatures lower than 870° C., no $ZrSiO_4$ could be generated even with heating times of more than 30 minutes. Temperatures higher than 965° C. have no additional advantageous effect on the transformation. At 965° C., a saturation of the transformation rate q was already achieved within 30 minutes.

In a refinement of the manufacturing method according to the present invention, the resistor paste is held at the temperature T of at least 870° C. for a time of at least 15 minutes and in particular at most 60 minutes, such that the higher the temperature T, the shorter the time can be. For transformation, this yields the freedom of either heating the resistor paste to a low temperature for longer and allowing the transformation to proceed slowly, if other components in or on the insulator or the spark plug should not be heated to too high a temperature; or accelerating the transformation by heating to a higher temperature for a shorter time.

DETAILED DESCRIPTION OF EXAMPLE EMBODIMENTS

Figure 1:
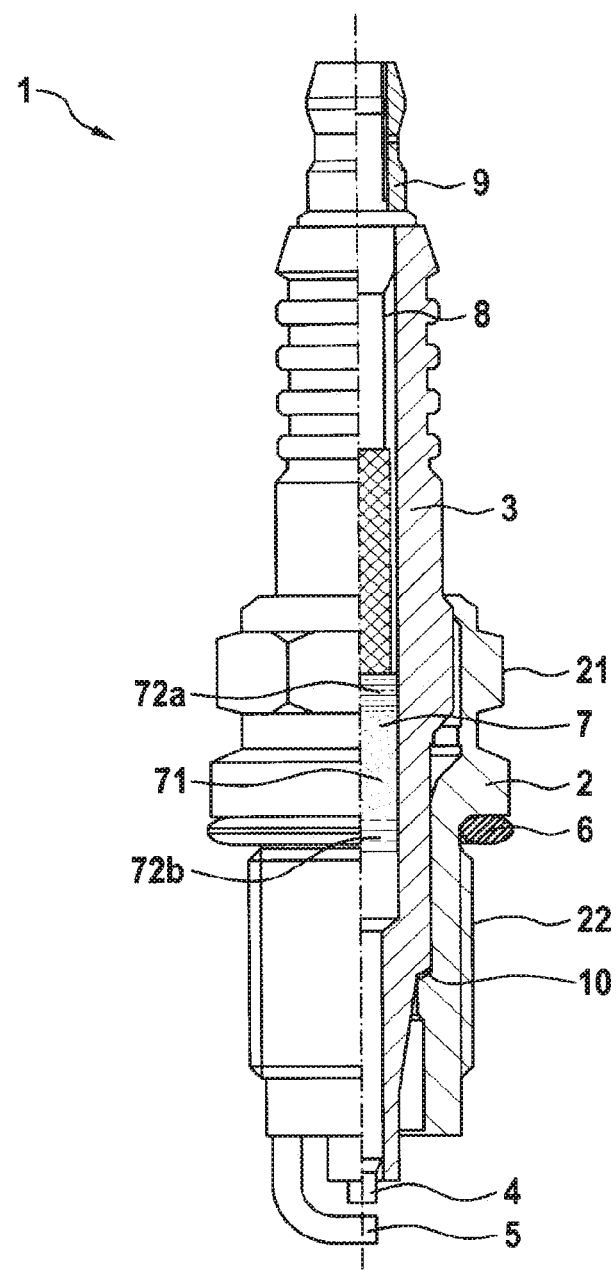
FIG. 1 shows an example of a spark plug.

FIG. 1 is a semi-section view of a spark plug 1. Spark plug 1 encompasses a housing 2. An insulator 3 is inserted into housing 2. Housing 2 and insulator 3 each have a bore along their longitudinal axis X. The longitudinal axis of housing 2, the longitudinal axis of insulator 3, and the longitudinal axis of spark plug 1 are coincident. A center electrode 4 is inserted into insulator 3. A terminal pin 8 also extends in insulator 3. Disposed on terminal pin 8 is a terminal nut 9 by way of which spark plug 1 is electrically contactable to a voltage source (not depicted here). Terminal nut 9 constitutes the combustion-chamber-remote end of spark plug 1. Located between center electrode 4 and terminal pin 8, in insulator 3, is a resistance element 7, also called a "paste."

Resistance element 7 electrically conductively connects center electrode 4 to terminal pin 8. Resistance element 7 is constructed, for example, as a layer system made up of a first contact paste 72a, a resistor paste 71, and a second contact paste 72b. The layers of resistance element 7 differ in terms of their material composition and the electrical resistance resulting therefrom. First contact paste 72a and second contact paste 72b can have different electrical resistances or an identical electrical resistance. Resistance element 7 can also have only one layer of resistor paste or several different layers of resistor paste having different material compositions and resistances.

Insulator 3 rests with a shoulder on a housing seat embodied on the inner housing side. Disposed between the insulator shoulder and the housing seat, in order to seal the air gap between the inner housing side and insulator 3, is an internal seal 10 that plastically deforms as insulator 3 is tightened in housing 2, and thereby seals the air gap.

A ground electrode 5 is disposed electrically conductively on housing 2 on the latter's combustion-chamber-side end face. Ground electrode 5 and center electrode 4 are disposed with respect to one another in such a way that a spark gap, at which the ignition spark is generated, forms between them.

Housing 2 has a shank. A polygon 21, a shrinkage undercut, and a thread 22 are embodied on that shank. Thread 22 serves for threading spark plug 1 into an internal combustion engine. An external sealing element 6 is disposed between thread 22 and polygon 21. In this exemplifying embodiment, external sealing element 6 is embodied as a bellows seal. Alternatively, external sealing element 6 can also be a solid seal.

Table 1 summarizes the results of the experiments. Each sample corresponds to a spark plug. Before heating, the resistor pastes of all the samples had the same material composition. It would also have been possible to carry out the transformation experiments on samples that correspond only to the resistance element or resistor paste, i.e. that have the corresponding material composition. In the initial state, i.e. before heating and thus before any possible transformation, the resistor paste contains a $ZrO_2$— and $SiO_2$-containing glass. Further constituents of the glass are, for example, $B_2O_3$, CaO, and $Li_2O$. Further constituents of the material composition of the resistor paste are, for example, carbons or ceramic particles such as $Al_2O_3$ or $TiO_2$.

Each sample was heated for a specific heating time t to a specific temperature T. The proportions of the various materials ($ZrO_2$ and $ZrSiO_4$) were then determined by XRD Rietveld analysis. The transformation rate q was determined in turn from that. The transformation rate q is calculated using the following formula:

$$q = \frac{w(ZrSiO_4)}{(w(ZrSiO_4) + w(ZrO_2))},$$

where w(X) is the proportion of material X, in wt %, after transformation, where X is $ZrSiO_4$ or $ZrO_2$.

TABLE 1

| Sample no. | $T_{sample}$ [° C.] | $t_{heat}$ [min] | q [%] |
|---|---|---|---|
| H1 | 860 | 30 | 0 |
| H6 | 890 | 10 | 0 |
| H7 | 890 | 15 | 0 |

TABLE 1-continued

| Sample no. | $T_{sample}$ [° C.] | $t_{heat}$ [min] | q [%] |
|---|---|---|---|
| H8 | 890 | 20 | 2 |
| H2 | 890 | 30 | 27 |
| H9 | 890 | 30 | 27 |
| H10 | 890 | 60 | 51 |
| H11 | 890 | 120 | 55 |
| H3 | 920 | 30 | 50 |
| H12 | 950 | 5 | 0 |
| H13 | 950 | 10 | 5 |
| H14 | 950 | 20 | 49 |
| H4 | 950 | 30 | 55 |
| H5 | 965 | 30 | 52 |

The results from this table are the data basis for the diagrams below in FIG. 2 and FIG. 3.

Figure 2:
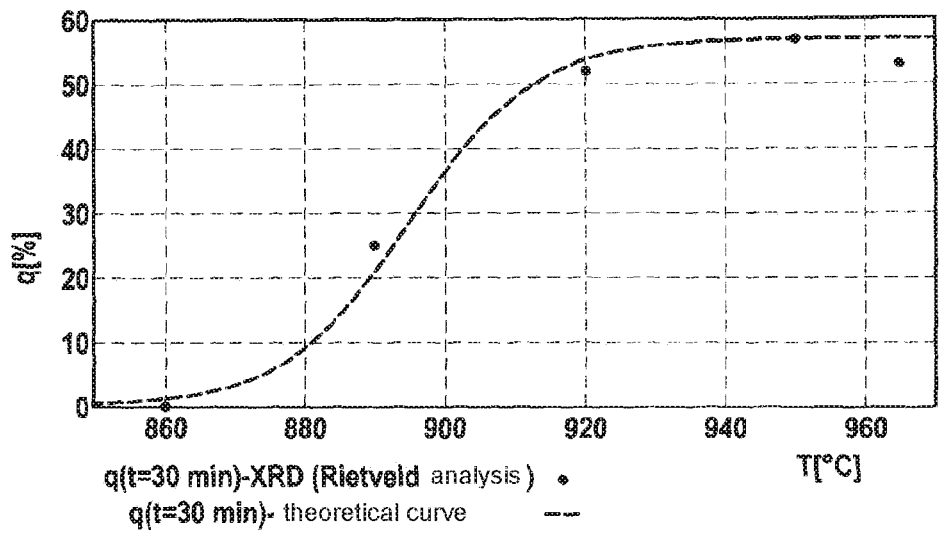
FIG. 2 shows the transformation rate q as a function of temperature T for a constant sample heating time t=30 minutes.

In FIG. 2, the transformation rate q (in %) is plotted against temperature T (in ° C.). Each data point here stands for a sample that was heated to the respective temperature T for 30 minutes. The dashed line is a theoretical curve that is obtained from the measured data using a simple fitting function $q(T)=q_{sat}*(e^{(-T+T_0)})^{-1}$, where T is the oven temperature, $q_{sat}$ the saturation value of the transformation rate, and $T_0$ is a fitting parameter. It is apparent from this diagram that for a heating time t of 30 minutes, the transformation q goes to a saturation of 50-55% for a temperature above about 920° C.

Figure 3:
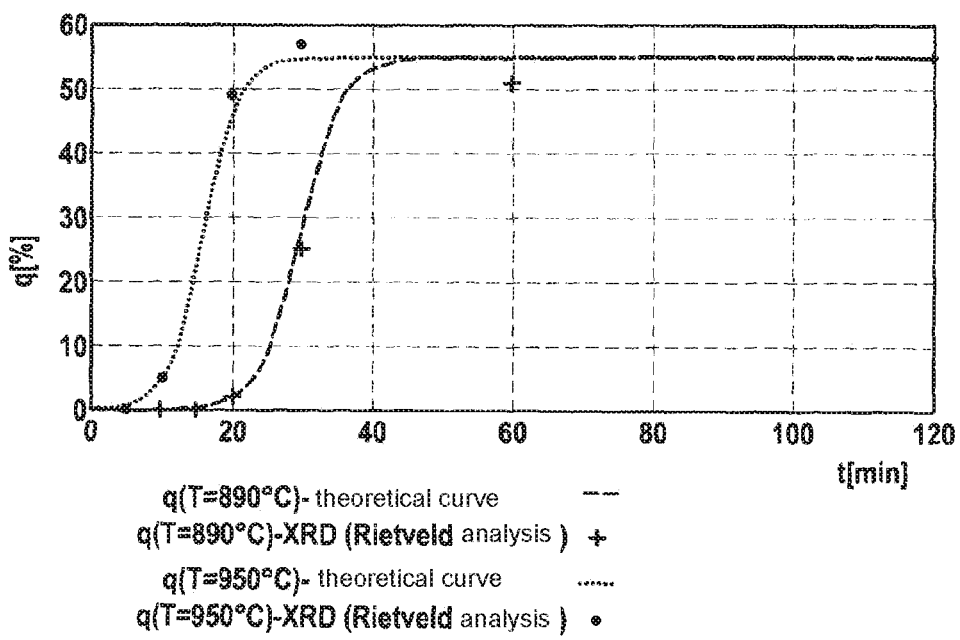
FIG. 3 shows the transformation rate q as a function of heating time t for comparative temperatures T=890° C. and T=950° C.

FIG. 3 is a diagram in which the transformation rate q (in %) is plotted against heating time t for two samples. The first sample (circles) was heated to 950° C. The second sample (crosses) was heated to 890° C. The transformation rate q was determined, as described above, for both samples after various times. The dashed lines are once again theoretical curves that are obtained from the respective measured data using a simple fitting function $q(t)=q_{sat}*(e^{(-t+t_0)})^{-1}$, where t is the heating time, $q_{sat}$ the saturation value of the transformation rate, and $t_0$ is a fitting parameter. The result evident from this diagram as well is that the transformation rate q goes to saturation at a value of 50-55%. The diagram also shows that this saturation is reached earlier in time for a higher temperature.

Figure 4:
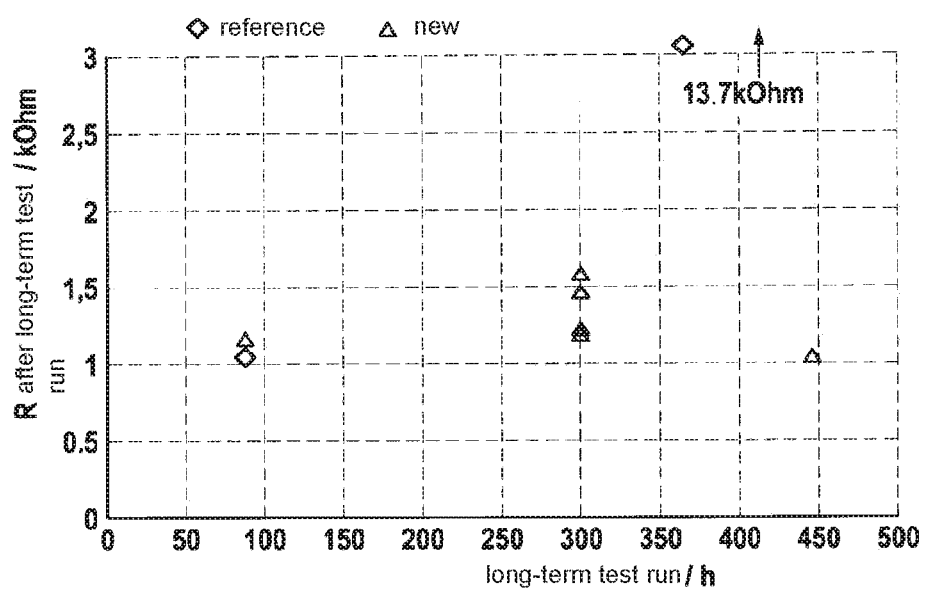
FIG. 4 shows the resistance of various samples after various long-term testing times.

FIG. 4 shows comparative resistance values of spark plugs after specific operating times t. Before the long-term test run began, all the spark plugs had an initial resistance value (circle data point) R(t=0)=1.5 kΩ.

The reference spark plug (diamond data point) and its resistance element were treated in accordance with sample H1 in Table 1, and have a transformation rate q=0%. After more than 350 operating hours the reference spark plug had a resistance R(350 h)=13.7 kΩ, which corresponds to a relative resistance change rW of 813%.

The relative resistance change (rW) is calculated as $$rW = \frac{|R(t) - R(t=0)|}{R(t=0)},$$

where R(t=0) is the resistance of the spark plug before the long-term test run begins, and R(t) is the resistance of the same spark plug after the operating time t.

The spark plugs in accordance with the present invention (triangle data point) and their resistance elements were treated in accordance with sample H3 in Table 1, and have a transformation rate q=50%. Each data point is a spark plug for which the test, and a subsequent determination of the resistance, were performed. The relative resistance change for all these novel spark plugs is less than 50%. The greatest relative resistance change (rW=33%) is found for the novel spark plug that has a resistance of approximately 1 kΩ after almost 450 operating hours.

Figure 5:
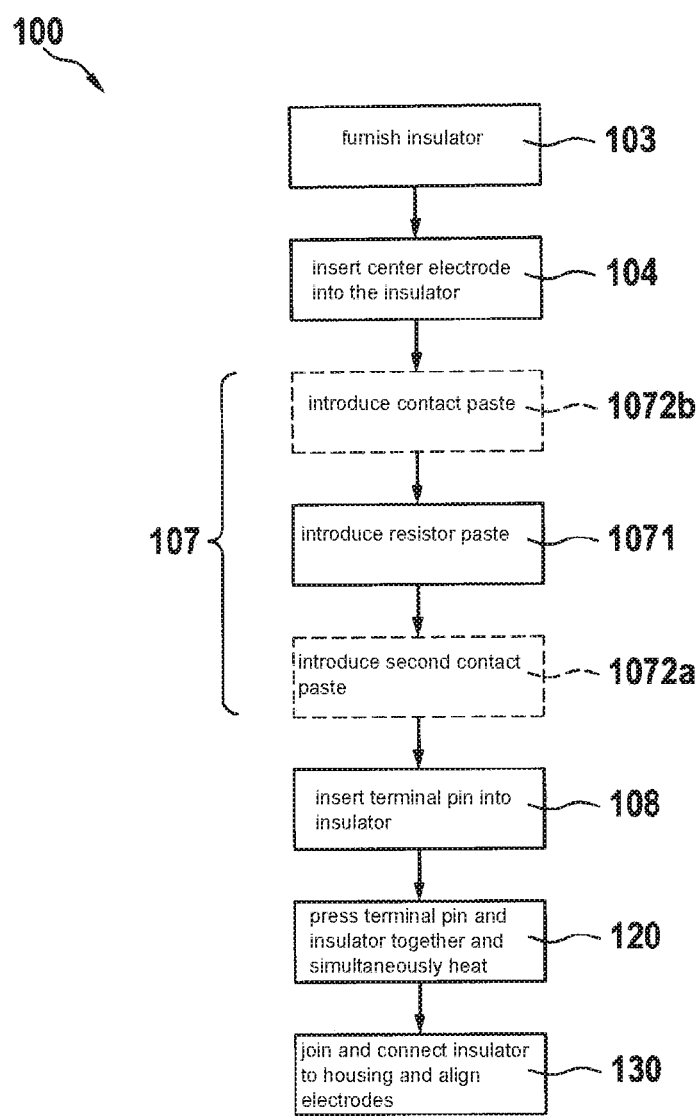
FIG. 5 schematically shows the manufacturing method for the spark plug according to the present invention.

FIG. 5 schematically depicts manufacturing method 100 for a spark plug; the individual steps for manufacturing the individual components of spark plug 1, such as the manufacture of insulator 3 or the manufacture and mixing of the material for resistance element 7, are not depicted here.

In a first step 103, insulator 103 of the spark plug is furnished. In a second step 104, the center electrode is inserted into the insulator. In a third step 107, the material for resistance element 7 is introduced into the insulator. Optionally, this step 107 can encompass three sub-steps: introducing contact paste 1072b, introducing resistor paste 1071, introducing second contact paste 1072a; a densification can occur as an intermediate step after each introduction. In a following step 108, terminal pin 8 is inserted into the insulator. In the next step 120, terminal pin 8 and insulator 3 are pressed together and simultaneously heated. The material of resistance element 7 is also heated in that context, so that the transformation of $ZrO_2$ and $SiO_2$ into $ZrSiO_4$ in resistance element 7 or resistor paste 71 takes place in this step 108. The temperature is at least 870° C. Further steps 130 then occur, in which the insulator is joined and connected to the housing, and the electrodes are aligned with one another.

What is claimed is:

1. A spark plug, comprising:
a housing;
an insulator disposed in the housing;
a center electrode disposed in the insulator;
a terminal pin disposed in the insulator;
a resistance element disposed in the insulator, the resistance element being disposed physically between the center electrode and the terminal pin, the resistance element electrically connecting the center electrode to the terminal pin, the resistance element including a resistor paste, the resistor paste being made up of a material mixture that contains $ZrO_2$, $SiO_2$, and $ZrSiO_4$; and
a ground electrode that is disposed on a combustion-chamber-side end face of the housing and, together with the center electrode, forms a spark gap;
wherein at least one of the following:
(I) the material mixture of the resistor paste is such that
(1) in the material mixture, $$\frac{w(ZrSiO_4)}{(w(ZrSiO_4) + w(ZrO_2))}$$

is at least 40%, (2) $w(ZrSiO_4)$ is a proportion, by weight percent, of $ZrSiO_4$ in the resistor paste, and (3) $w(ZrO_2)$ is a proportion, by weight percent, of $ZrO_2$ in the resistor paste; and
(II) the resistor paste is structured so that a subjection of the resistor paste in the spark plug to 300 hours of operation of the spark plug would not cause in the resistor paste a relative resistance change as high as 50%.

2. The spark plug as recited in claim 1, wherein:
in the material mixture, $$\frac{w(ZrSiO_4)}{(w(ZrSiO_4) + w(ZrO_2))}$$

is at least 40%;
w(ZrSiO$_4$) is the proportion, by weight percent, of ZrSiO$_4$ in the resistor paste; and
w(ZrO$_2$) is a proportion, by weight percent, of ZrO$_2$ in the resistor paste.

3. The spark plug as recited in claim 1, wherein the resistor paste is structured so that the subjection of the resistor paste in the spark plug to 300 hours of operation of the spark plug would not cause in the resistor paste a relative resistance change as high as 50%.

4. The spark plug as recited in claim 1, wherein:
in the material mixture, $$\frac{w(ZrSiO_4)}{(w(ZrSiO_4) + w(ZrO_2))}$$

is equal to 40%;
w(ZrSiO$_4$) is the proportion, by weight percent, of ZrSiO$_4$ in the resistor paste; and
w(ZrO$_2$) is a proportion, by weight percent, of ZrO$_2$ in the resistor paste.

5. The spark plug as recited in claim 1, wherein:
in the material mixture, $$\frac{w(ZrSiO_4)}{(w(ZrSiO_4) + w(ZrO_2))}$$

is at least 50%;
w(ZrSiO$_4$) is the proportion, by weight percent, of ZrSiO$_4$ in the resistor paste; and
w(ZrO$_2$) is a proportion, by weight percent, of ZrO$_2$ in the resistor paste.

6. The spark plug as recited in claim 1, wherein:
in the material mixture, $$\frac{w(ZrSiO_4)}{(w(ZrSiO_4) + w(ZrO_2))}$$

is in a range of 50-55%;
w(ZrSiO$_4$) is the proportion, by weight percent, of ZrSiO$_4$ in the resistor paste; and
w(ZrO$_2$) is a proportion, by weight percent, of ZrO$_2$ in the resistor paste.

7. A method for manufacturing a spark plug, comprising the following steps:
furnishing an insulator;
introducing into the insulator a material mixture that is configured to constitute a resistor paste, the material mixture containing ZrO$_2$ and SiO$_2$; and
heating the insulator and the material mixture in the insulator to a temperature of at least 870° C., so that ZrO$_2$ and SiO$_2$ in the material mixture react at least partly to ZrSiO$_4$ thereby forming a resulting material mixture, wherein at least one of:
(I) the resulting material mixture is such that (1) in the resulting material mixture, $$\frac{w(ZrSiO_4)}{(w(ZrSiO_4) + w(ZrO_2))}$$

is at least 40%, (2) w(ZrSiO$_4$) is a proportion, by weight percent, of ZrSiO$_4$ in the resistor paste, and (3) w(ZrO$_2$) is a proportion, by weight percent, of ZrO$_2$ in the resistor paste; and
(II) the resulting material mixture is structured so that a subjection of the resulting material mixture in the spark plug to 300 hours of operation of the spark plug would not cause in the resulting material mixture a relative resistance change as high as 50%.

8. The method as recited in claim 7, wherein the resulting material mixture is such that:
in the resulting material mixture, $$\frac{w(ZrSiO_4)}{(w(ZrSiO_4) + w(ZrO_2))}$$

is at least 40%;
w(ZrSiO$_4$) is the proportion, by weight percent, of ZrSiO$_4$ in the resistor paste; and
w(ZrO$_2$) is a proportion, by weight percent, of ZrO$_2$ in the resistor paste.

9. The method as recited in claim 7, wherein the temperature is in a range from 870° C. to 965° C.

10. The method as recited in claim 7, wherein the temperature is maintained for a time, the time being with a range from and including 15 minutes to and including 60 minutes, such that the higher the temperature of the range that is used, the shorter the time can be.

11. The method as recited in claim 7, wherein the resulting material mixture is structured so that the subjection of the resulting material mixture in the spark plug to 300 hours of operation of the spark plug would not cause in the resulting material mixture a relative resistance change as high as 50%.

12. The method as recited in claim 7, wherein the resulting material mixture is such that:
in the resulting material mixture, $$\frac{w(ZrSiO_4)}{(w(ZrSiO_4) + w(ZrO_2))}$$

is equal to 40%;
w(ZrSiO$_4$) is the proportion, by weight percent, of ZrSiO$_4$ in the resistor paste; and
w(ZrO$_2$) is a proportion, by weight percent, of ZrO$_2$ in the resistor paste.

13. The method as recited in claim 7, wherein the resulting material mixture is such that:
in the resulting material mixture, $$\frac{w(ZrSiO_4)}{(w(ZrSiO_4) + w(ZrO_2))}$$

is at least 50%;
w(ZrSiO$_4$) is the proportion, by weight percent, of ZrSiO$_4$ in the resistor paste; and
w(ZrO$_2$) is a proportion, by weight percent, of ZrO$_2$ in the resistor paste.

14. The method as recited in claim 7, wherein the resulting material mixture is such that:
in the resulting material mixture, $$\frac{w(ZrSiO_4)}{(w(ZrSiO_4) + w(ZrO_2))}$$

is in a range of 50-55%;
- $w(ZrSiO_4)$ is the proportion, by weight percent, of $ZrSiO_4$ in the resistor paste; and
- $w(ZrO_2)$ is a proportion, by weight percent, of $ZrO_2$ in the resistor paste.

* * * * *